US011027326B2

(12) United States Patent
Eusterwiemann (10) Patent No.: US 11,027,326 B2
(45) Date of Patent: Jun. 8, 2021

(54) END EFFECTOR FOR A RIVETING DEVICE (71) Applicant: Broetje-Automation GmbH, Rastede (DE)

(72) Inventor: Christoph Eusterwiemann, Oldenburg (DE)

(73) Assignee: Broetje-Automation GmbH, Rastede (DE)

( * ) Notice: Subject to any disclaimer, the term of this patent is extended or adjusted under 35 U.S.C. 154(b) by 335 days.

(21) Appl. No.: 15/778,338

(22) PCT Filed: Nov. 23, 2016

(86) PCT No.: PCT/EP2016/078588
§ 371 (c)(1),
(2) Date: May 23, 2018

(87) PCT Pub. No.: WO2017/089418
PCT Pub. Date: Dec. 1, 2017

(65) Prior Publication Data
US 2018/0345354 A1 Dec. 6, 2018

(30) Foreign Application Priority Data

Nov. 23, 2015 (DE) .......................... 102015120239.5
Jun. 14, 2016 (DE) .......................... 102016110914.2

(51) Int. Cl.
*B21J 15/32* (2006.01)
*B21J 15/10* (2006.01)
(Continued)

(52) U.S. Cl.
CPC ............. *B21J 15/32* (2013.01); *B21J 15/105* (2013.01); *B23P 19/002* (2013.01);
(Continued)

(58) Field of Classification Search
CPC ........ B21J 15/32; B21J 15/105; B21J 15/142; B21J 15/10; B23P 19/002; B23P 19/006; B23P 19/00; B23P 19/001; B23K 9/20
(Continued)

(56) References Cited

U.S. PATENT DOCUMENTS 4,662,556 A * 5/1987 Gidlund .................... B21J 15/10
227/111
4,747,294 A * 5/1988 Schwartz ................. B21J 15/32
227/112
(Continued)

FOREIGN PATENT DOCUMENTS

DE 102005028055 12/2006
DE 202015104273 11/2016
(Continued)

OTHER PUBLICATIONS

"International Preliminary Report on Patentability," for PCT Application No. PCT/EP2016/078588 dated May 29, 2018 (8 pages).
(Continued)

*Primary Examiner* — Scott A Smith
(74) *Attorney, Agent, or Firm* — Pauly, DeVries Smith & Deffner LLC (57) ABSTRACT

The disclosure relates to an end effector for a riveting device, wherein the end effector includes a riveting module for placing a rivet element in a structural part, a rivet dispenser for dispensing rivet elements from a rivet magazine and a handling device for delivering a rivet element from the rivet dispenser to the riveting module The handling device includes an adjustment kinematics and a gripper arranged thereon for grabbing the rivet element. In some cases the adjustment kinematics has at least two adjustment axes for positioning the gripper.

20 Claims, 9 Drawing Sheets

(51) Int. Cl.
  *B23P 19/00* (2006.01)
  *B21J 15/14* (2006.01)
(52) U.S. Cl.
  CPC ............ *B23P 19/006* (2013.01); *B21J 15/10* (2013.01); *B21J 15/142* (2013.01)
(58) Field of Classification Search
  USPC ................... 227/51, 53, 110, 111, 112, 152; 29/243.54, 402.01, 525.01, 809, 812.5, 29/897.2, 700, 701, 34 B
  See application file for complete search history.

(56) References Cited

U.S. PATENT DOCUMENTS

| | | | | |
|---|---|---|---|---|
| 5,375,754 | A * | 12/1994 | Botha | B21J 15/10 227/114 |
| 8,479,382 | B2 * | 7/2013 | Sarh | B21J 15/142 29/809 |
| 9,296,076 | B2 * | 3/2016 | Soto Martinez | B21J 15/022 |
| 9,789,531 | B2 * | 10/2017 | Ikeda | B21J 15/147 |
| 2006/0218780 | A1 * | 10/2006 | Lewis | B23Q 39/02 29/798 |
| 2008/0244888 | A1 | 10/2008 | Sarh | |
| 2010/0163595 | A1 * | 7/2010 | Draht | B23P 19/003 227/120 |
| 2010/0180424 | A1 * | 7/2010 | Le Vacon | B21J 15/10 29/505 |
| 2011/0239448 | A1 * | 10/2011 | Sarh | B21J 15/142 29/701 |
| 2013/0212883 | A1 * | 8/2013 | Soto Martinez | B21J 15/32 29/897.2 |
| 2015/0273570 | A1 | 10/2015 | Ikeda | |

FOREIGN PATENT DOCUMENTS

| | | |
|---|---|---|
| EP | 2628565 | 8/2013 |
| EP | 3031549 | 6/2016 |
| EP | 3037190 | 6/2016 |
| WO | 2017089418 | 6/2017 |

OTHER PUBLICATIONS

"International Search Report and Written Opinion," for PCT Application No. PCT/EP2016/078588 dated Feb. 21, 2017 (13 pages).

* cited by examiner

END EFFECTOR FOR A RIVETING DEVICE

CROSS-REFERENCE TO RELATED APPLICATIONS

This application is a national stage application under 35 U.S.C. 371 of International Patent Application Serial No. PCT/EP2016/078588, entitled "End Effector For a Riviting Device," filed Nov. 23, 2016, which claims priority from German Patent Application No. DE 10 2015 120 239.5, filed Nov. 23, 2015, and German Patent Application No. DE 10 2016 110 914.2, filed Jun. 14, 2016, the disclosures of which are incorporated herein by reference.

FIELD OF THE TECHNOLOGY

The disclosure relates to an end effector for a riveting device, a riveting device with an end effector, and a method for operating a riveting device.

BACKGROUND

End effectors for riveting devices for the placement of rivet elements in structural parts are known from the prior art in various configurations.

For example, DE 10 2005 028 055 A1 describes a riveting device for the riveting of aircraft structural components. The riveting device comprises a rivet magazine, from which the rivets are delivered directly into an interim magazine. The interim magazine is in the form of a turret and has a number of grippers, in which the rivet elements are stored in the meantime. By rotating the interim magazine, the rivet elements are delivered as needed to the riveting finger and pushed from the gripper by a tongue into the riveting finger. The rivet element is not guided in this process and it may become canted and therefore may not be picked up by the riveting finger securely or so as to be correctly aligned. If this occurs, an interruption in the manufacturing process may be needed so that a worker can manually remove the rivet element from the riveting finger.

Furthermore, the rivet interim magazine described in DE 10 2005 028 055 A1 is relatively elaborate and thus costly. It has many moving parts, for example each gripper and therefore each storage location for a rivet element has its own drive unit.

Finally, the interim magazine occupies a relatively large amount of space at the end effector of the riveting device, due to its turret shape.

SUMMARY

The disclosure proposes to solve the problem of designing and modifying the known end effector as well as the known riveting device such that the manufacturing process becomes more robust and a variety of different rivet elements can be supplied in simple, cost-effective and space-saving manner to the riveting module.

This problem is solved by an end effector as described herein.

Specifically, it is proposed for this that the end effector comprises a riveting module for placing a rivet element in a structural part, a rivet dispenser for dispensing rivet elements from a rivet magazine and a handling device for delivering a rivet element from the rivet dispenser to the riveting module.

According to the proposal, the handling device comprises an adjustment kinematics and a gripper arranged thereon for grabbing the rivet element, wherein the adjustment kinematics has at least two adjustment axes for positioning the at least one gripper. In this way, rivet elements can be securely handed off to the riveting module, since the movement range of the gripper for the handoff to the riveting module is enlarged by the at least two adjustment axes of the adjustment kinematics.

Furthermore, a more flexible arrangement of rivet dispenser and riveting module relative to each other is made possible, so that overall a more compact structure results. Moreover, the costs can be reduced by the use of traditional handling devices as opposed to the interim magazines to be manufactured individually in the above-described prior art.

Moreover, the stated problem is solved by a riveting device with an end effector having the features disclosed herein. Here as well, the rivet dispenser and/or the handling device can be arranged on the end effector, but in addition or alternatively the rivet dispenser and/or the handling device may also be arranged on the riveting device. The same benefits are created as described above in connection with the end effector.

In some embodiments, the adjustment kinematics for the positioning of the at least one gripper comprises at least three adjustment axes, and in some embodiments, the adjustment kinematics for the positioning of the at least one gripper comprises at least four adjustment axes. Thanks to further adjustment axes, a more flexible arrangement of riveting module and rivet dispenser relative to each other is accomplished. In this way, structural space can be better utilized and on the whole a more compact construction is achieved.

Further, the adjustment axes of the adjustment kinematics can be arranged kinematically sequentially and/or kinematically parallel. In this way, compact designs can be achieved, depending on the configuration and arrangement of rivet dispenser and riveting module.

In some embodiments it is proposed that the riveting device, especially the end effector, comprises an interim magazine, especially one with no actuator, for the storing of rivet elements. This makes possible a lightweight, simple interim storage of rivet elements near the riveting module.

Furthermore, according to additional embodiments, an end effector for a riveting device is disclosed, wherein the end effector comprises a riveting module for placing a rivet element in a structural part, a rivet dispenser for dispensing rivet elements from a rivet magazine, and an actuator-free interim magazine for storing rivet elements. This creates an economical interim magazine, making possible a lightweight, simple interim storage of rivet elements near the riveting module. This end effector may also be designed in particular without a handling device for delivery of a rivet element from the rivet dispenser to the riveting module, where the handling device has an adjustment kinematics and a gripper arranged thereon for the grabbing of the rivet element, and in particular without the adjustment kinematics having at least two adjustment axes for the positioning of the gripper.

According to additional embodiments, a riveting device with an end effector is disclosed, wherein the end effector comprises a riveting module for placing a rivet element in a structural part, wherein the riveting device, especially the end effector, comprises a rivet dispenser for dispensing rivet elements from a rivet magazine and wherein the riveting device, especially the end effector, comprises an actuator-free interim magazine for storing rivet elements. This creates an economical interim magazine, making possible a lightweight, simple interim storage of rivet elements near the riveting module. This end effector may also be designed in particular without a handling device for delivery of a rivet element from the rivet dispenser to the riveting module, where the handling device has an adjustment kinematics and a gripper arranged thereon for the grabbing of the rivet element, and in particular without the adjustment kinematics having at least two adjustment axes for the positioning of the gripper.

In some embodiments, however, the aforementioned end effector and the aforementioned riveting device have a handling device, especially with an adjustment kinematics for delivering a rivet element from the rivet dispenser and/or the interim magazine to the riveting module and/or to the interim magazine. For an embodiment of the handling device, reference is made to the specification.

In some embodiments, the interim magazine is designed to receive rivet elements of different type and/or different size.

The handling device may load the rivet magazine with rivet elements from the rivet dispenser and/or the riveting module. In addition or alternatively, the riveting module may be supplied with rivet elements from the interim magazine by the handling device.

According to the method, the problem stated at the outset is solved according to embodiments described herein.

In an end effector as proposed or a riveting device as proposed, the fact that the gripper of the handling device grabs a rivet element at the rivet dispenser and the handling device delivers the rivet element to the riveting module via a movement of the adjustment kinematics and passes it on to the riveting module achieves the same advantages as described above in connection with the end effector and the riveting device.

In one modification of the method, the gripper takes up the rivet element at the rivet dispenser and/or the interim magazine in position-defined manner and/or passes on the rivet element in position-defined manner to the riveting module and/or the interim magazine. In this way, the process quality can be further improved, since the rivet cannot get jammed or slip during the handoff.

Some embodiments provide an end effector for a riveting device, wherein the end effector comprises a riveting module for placing a rivet element in a structural part, a rivet dispenser for dispensing rivet elements from a rivet magazine and a handling device for delivering a rivet element from the rivet dispenser to the riveting module, wherein the handling device comprises an adjustment kinematics and a gripper arranged thereon for grabbing the rivet element, wherein the adjustment kinematics has at least two adjustment axes for positioning the gripper.

Some embodiments provide a riveting device with an end effector, wherein the end effector comprises a riveting module for placing a rivet element in a structural part, wherein the riveting device, especially the end effector, comprises a rivet dispenser for dispensing rivet elements from a rivet magazine, wherein the riveting device, especially the end effector, comprises a handling device for delivering a rivet element from the rivet dispenser to the riveting module, wherein the handling device comprises an adjustment kinematics and a gripper arranged thereon for grabbing the rivet element, wherein the adjustment kinematics has at least two adjustment axes for positioning the gripper.

In various embodiments, the riveting device comprises a robot, especially a gantry robot, which carries the end effector, wherein the handling device is arranged separately from the end effector on the robot carrying the end effector.

In various embodiments, the adjustment kinematics for the positioning of the at least one gripper comprises at least three adjustment axes, wherein the adjustment kinematics for the positioning of the at least one gripper comprises at least four adjustment axes.

In various embodiments, the adjustment axes of the adjustment kinematics are arranged kinematically sequentially and/or kinematically parallel.

In various embodiments, the handling device is designed as a bending-arm robot and/or industrial robot.

In various embodiments, the gripper comprises at least two gripping fingers and can grab rivet elements of different type and/or different size.

In various embodiments, the gripper holds the rivet element with non-positive fit and/or positive fit when delivering the rivet element.

In various embodiments, the riveting module comprises a riveting tool and at least one riveting finger, wherein the riveting finger extends along a geometrical longitudinal axis along which the rivet element is inserted into the structural part.

In various embodiments, the rivet dispenser comprises a stopper for stopping and position-defined holding of a rivet element fed from a rivet magazine.

In various embodiments, the riveting device, especially the end effector, comprises an interim magazine, especially one with no actuator, for the storing of rivet elements, wherein the interim magazine is designed to receive rivet elements of different type and/or different size.

In various embodiments, the interim magazine has spring elements, especially tension spring clips, which hold the rivet elements received in the interim magazine in position-defined manner.

In various embodiments, the riveting device comprises a control system, an NC-control system, wherein the handling device comprises its own control system, especially an NC-control system, which communicates via an interface with the control system of the riveting device.

In various embodiments, the gripper of the handling device grabs a rivet element at the rivet dispenser and the handling device delivers the rivet element to the riveting module via a movement of the adjustment kinematics and passes it on to the riveting module.

In various embodiments, the gripper takes up the rivet element at the rivet dispenser and/or the interim magazine in position-defined manner and/or wherein the gripper passes on the rivet element in position-defined manner to the riveting module and/or the interim magazine, wherein the gripper only releases the rivet element during the handover when the rivet element is situated in the longitudinal axis of the riveting finger and/or in a holding position of the interim magazine.

BRIEF DESCRIPTION OF THE DRAWINGS

In the following, the disclosure shall be explained more closely with the aid of a drawing representing merely one sample embodiment. In the drawing.

DETAILED DESCRIPTION

Figure 1:
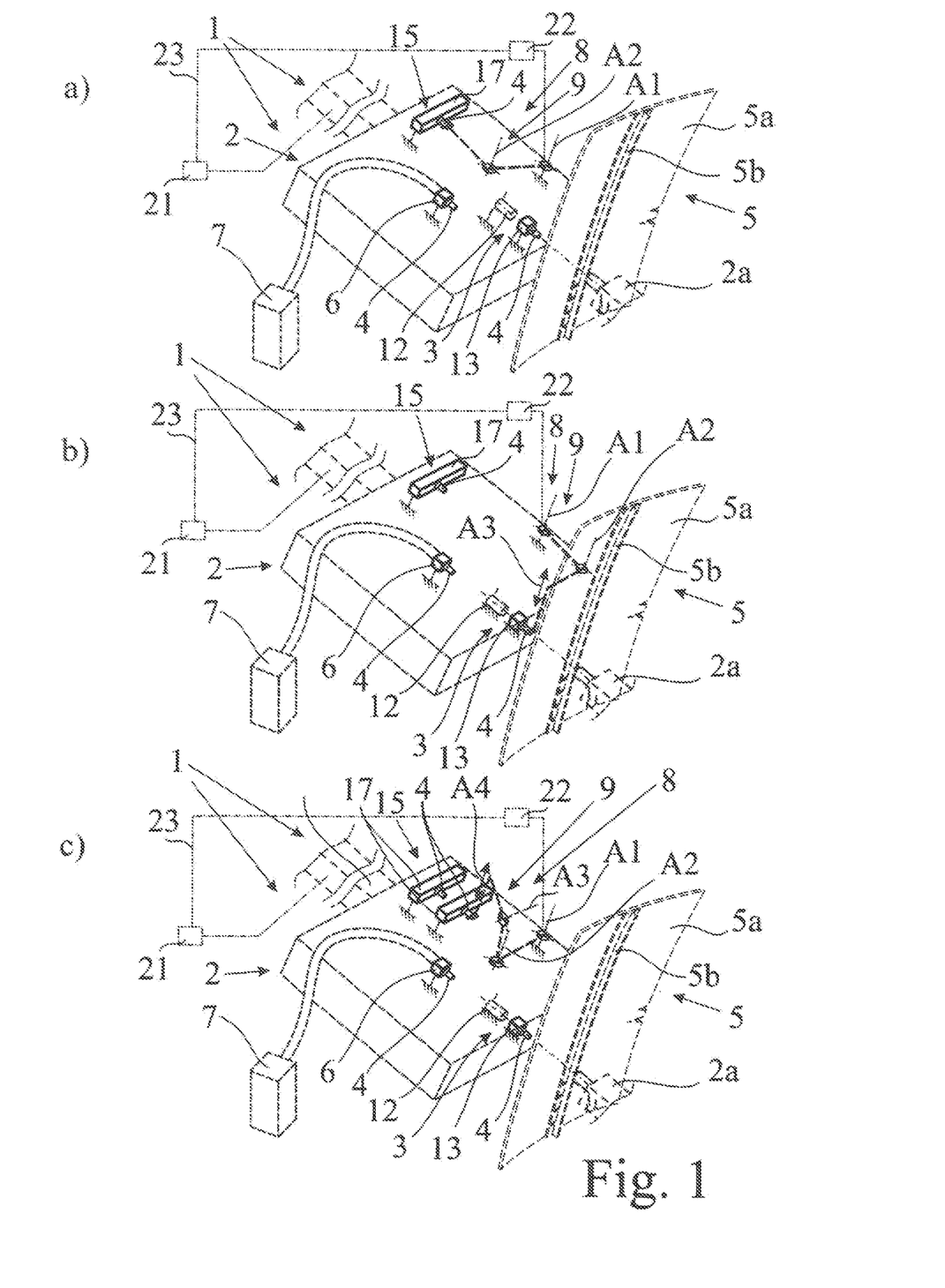
FIG. 1 schematically shows a proposed end effector or an end effector of a proposed riveting device with a) an adjustment kinematics with two adjustment axes, b) an adjustment kinematics with three adjustment axes and c) an adjustment kinematics with four adjustment axes.

FIG. 1 shows a proposed end effector 2 for a riveting device 1. The end effector 2 has a riveting module 3 for placing a rivet element 4 in a structural part 5.

Furthermore, the end effector 2 may have a drilling module (not shown) for the drilling of rivet holes, and/or a measurement module (not shown) for measuring the holes drilled.

The riveting device 1 here has a robot, which carries the end effector 2. The robot can be designed as a gantry robot. The end effector 2 may be carried as a machining tool, in particular by a riveting device or otherwise a boring and riveting device, as is described in the German utility model application DE 20 2015 104 273. In this respect, reference is made to DE 20 2015 104 273.

The structural part 5 here has two parts 5a, 5b to be joined together. Here, they form a subassembly after being riveted. Here, the structural part 5 or the subassembly is an aircraft structural part.

The placement of rivet elements 4 in structural parts 5 is generally done in the following sequence. The structural part 5, or the parts 5a, 5b to be joined together, is at first drilled and the borehole is then measured. Depending on the measurement result for the borehole, the type and/or the size, especially the diameter and length, of the rivet element 4 is then determined, especially by means of a measurement module (not shown). As a result, there are a variety of rivet elements 4 which need to be supplied to the riveting module 3, depending on the measurement result.

Usually it cannot be determined prior to the drilling which precise rivet element 4 will be needed for the borehole being made. This can only be determined from the actual geometry of the borehole. Therefore, various rivet elements 4 must be kept on hand, such as in proximity to the riveting module 3. If the rivet element 4 to be used is known according to the measurement, it can be supplied to the riveting module 1.

The proposed riveting device 1, here the end effector 2, comprises a rivet dispenser 6 for dispensing rivet elements 4 from a rivet magazine 7. The rivet magazine 7 may be arranged at the end effector 2 and/or at the robot carrying the end effector 2. In some embodiments, it is arranged separately from the end effector 2, especially separately from the riveting device 1.

Figure 2:
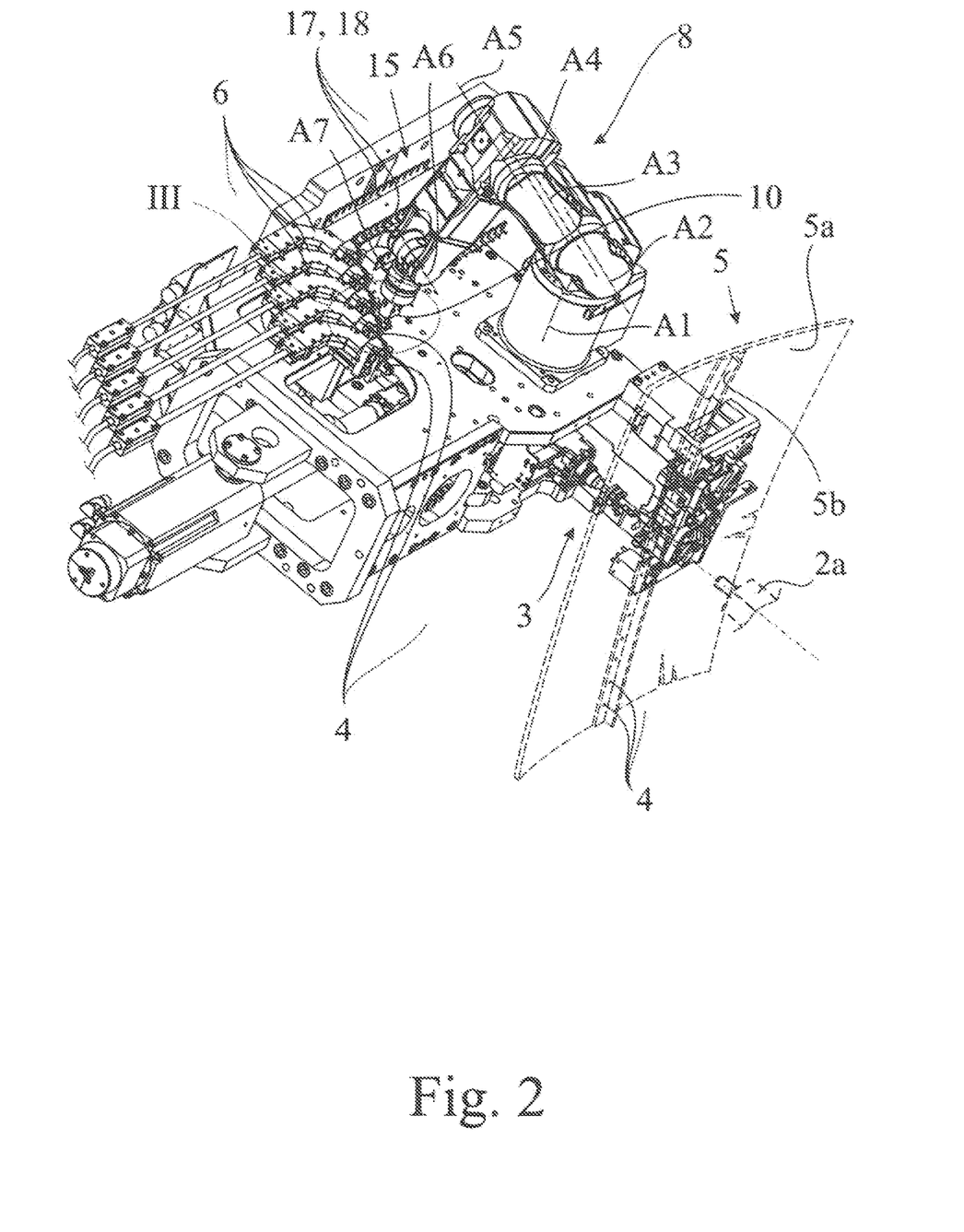
FIG. 2 shows another sample embodiment of a proposed end effector or an end effector of a proposed riveting device in three-dimensional representation.
Figure 3:
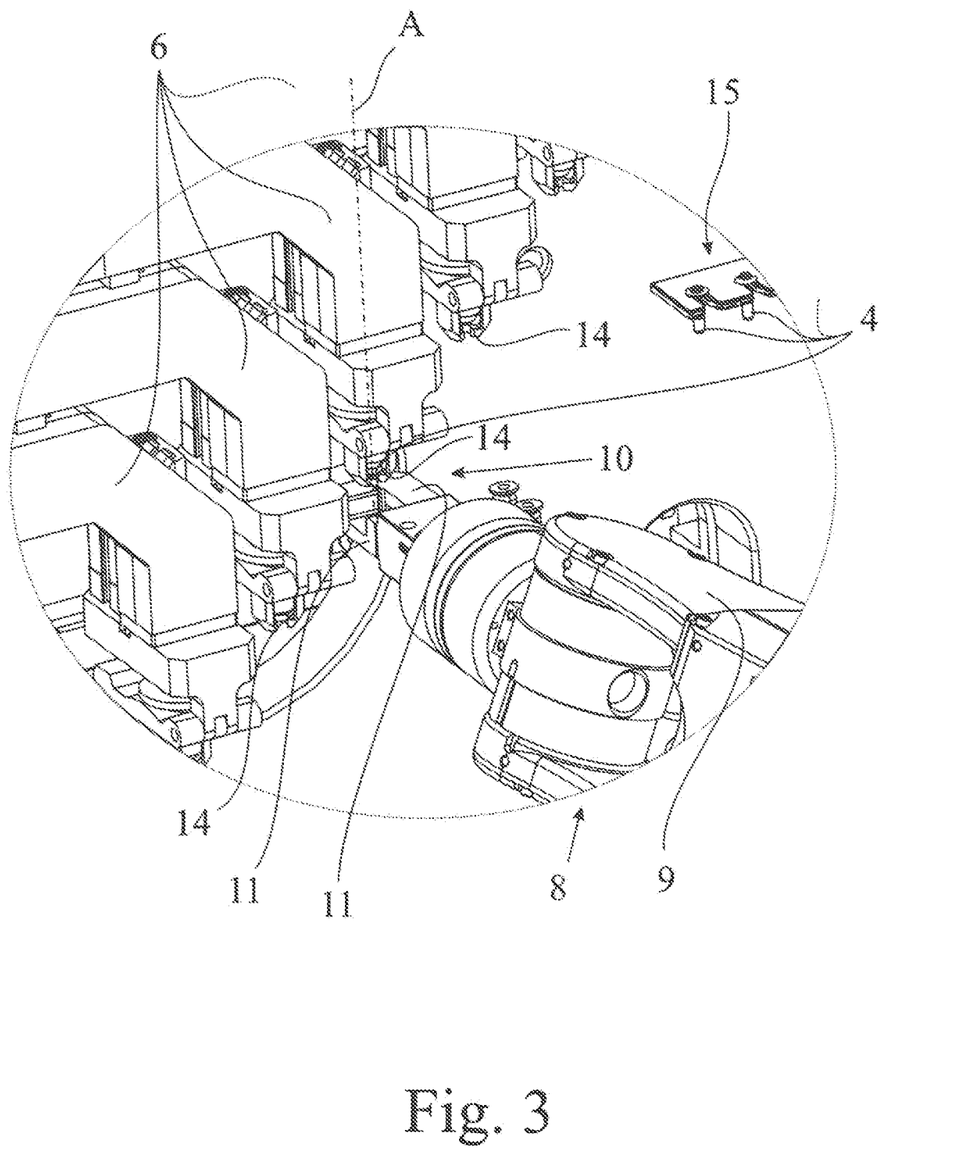
FIG. 3 shows the gripper according to the sample embodiment of FIG. 2 in a position at a rivet dispenser.

Further rivet dispensers 6 may be provided, especially for rivet elements 4 of different type and/or different size, as is shown in FIGS. 2 and 3. In some embodiments, the riveting device 1 has several feeds from the rivet magazine 7 to the rivet dispensers 6. Here, each rivet dispenser 6 has its own feed from the rivet magazine 7. In the following remarks, the singular shall be used for the rivet dispenser 6 or the rivet dispensers 6, but the remarks on a rivet dispenser 6 can hold analogously for the further rivet dispensers 6.

The proposed riveting device 1, here the end effector 2, comprises a handling device 8 for delivering a rivet element 4 from the rivet dispenser 6 to the riveting module 3.

The handling device 8 comprises an adjustment kinematics 9 and a gripper 10 arranged thereon for grabbing the rivet element 4. The adjustment kinematics 9, in turn, has per the proposal at least two adjustment axes A1, A2, A3, A4, A5, A6, A7 for positioning the gripper 10. In this way, the rivet elements 4 can be securely passed on to the riveting module 3. A canting or skewed insertion can be reliably prevented.

Furthermore, a more flexible arrangement of rivet dispenser 6 and riveting module 3 relative to each other becomes possible, so that on the whole a more compact construction results. Moreover, the costs can be reduced through the use of customary handling devices 8.

In some embodiments, the rivet dispenser 6 can be arranged at the end effector 2, but in the proposed riveting device 1 the rivet dispenser 6 may also be arranged separately from the end effector 2 on the riveting device 1.

This holds likewise for the handling device 8. The handling device 8 in the proposed end effector 2 is arranged on the latter, but alternatively the handling device 8 in the proposed riveting device 1 may also be arranged separately from the end effector 2 on the riveting device 1.

In particular, the rivet dispenser 6 and/or the handling device 8 may be arranged on the robot carrying the end effector 2.

The adjustment kinematics 9 for the positioning of the gripper 10 can have not only at least two adjustment axes A1, A2, A3, A4, A5, A6, A7, as is shown in FIG. 1a. In some embodiments, the adjustment kinematics 9 for the positioning of the gripper 10 comprises at least three adjustment axes A1, A2, A3, A4, A5, A6, A7, as is shown in FIG. 1b. Further in some embodiments, the adjustment kinematics 9 for the positioning of the gripper 10 comprises at least four adjustment axes A1, A2, A3, A4, A5, A6, A7, as is shown in FIG. 1c. Thanks to an increase in the number of adjustment axes A1, A2, A3, A4, A5, A6, A7, a more flexible arrangement of the rivet dispenser 6 with respect to the riveting module 3 is possible.

The adjustment axes A1, A2, A3, A4, A5, A6, A7 of the handling device 8 here can each have their own independent drive unit. In this way, the most flexible possible motion control system is achieved. Alternatively, however, individual adjustment axes A1, A2, A3, A4, A5, A6, A7 may also be driven jointly and indirectly via a driven force transmitting element.

In some embodiments, the adjustment axes A1, A2, A3, A4, A5, A6, A7 of the adjustment kinematics 9 are arranged kinematically sequentially and/or kinematically parallel. Depending on the disposition of the rivet dispenser 6 relative to the riveting module 3, a kinematically sequential and/or a kinematically parallel arrangement of the adjustment axes A1, A2, A3, A4, A5, A6, A7 may make possible a compact layout.

In addition or alternatively, at least one adjustment axis A1, A2, A3, A4, A5, A6, A7 of the handling device 8 is a rotation axis and/or a linear axis. In some embodiments, at least two adjustment axes A1, A2, A3, A4, A5, A6, A7 of the handling device 8 are rotation axes and/or linear axes. In the sample embodiment of FIG. 1a, the handling device 8 has e.g. two rotation axes as the adjustment axes A1, A2. In the sample embodiment of FIG. 1b, the adjustment kinematics 9 has two rotation axes and one linear axis as the adjustment axis A1, A2, A3. In the sample embodiment of FIG. 1c, the adjustment kinematics 9 has a further rotation axis.

In the sample embodiment of FIGS. 1b and 1n some embodiments, a handling device 8 designed as a bending-arm robot is used. A bending-arm robot here may be designed as a vertical bending-arm robot and/or as a horizontal bending-arm robot. Alternatively, however, the handling device 8 may be designed as an industrial robot. This is shown in the sample embodiment of FIGS. 2 to 7.

For further increasing the flexibility of the handling device 8, the adjustment kinematics 9 for the positioning of the gripper 10 may have at least five, such as at least six, further such as at least seven adjustment axes A1, A2, A3, A4, A5, A6, A7. In such an embodiment, a design of the handling device 8 as an industrial robot has proven to be especially expedient. In the sample embodiment of FIGS. 2 to 7, for example, an industrial robot with seven adjustment axes is used.

For the grabbing of the rivet elements 4, here the gripper 10 comprises at least two gripping fingers 11. In the delivery process, the gripper 10 holds the rivet element 4 such as with non-positive fit and/or positive fit. In some embodiments, the gripper 10 can grab rivet elements 4 of different type and/or different size. In this way, different rivet elements 4 can be delivered to the riveting module 3 with the gripper 10. In some embodiments, the gripper 10 grabs precisely one rivet element 4. Here, it is not designed to deliver several rivet elements 4 at the same time.

In addition or alternatively, a further gripper 10 can be arranged at the adjustment kinematics 9. In some embodiments, the two grippers 10 are arranged opposite each other and can turn as a unit. In this case, a rivet element 4 can be removed in simple fashion for example from the riveting module 3 with a gripper 10 and after an adjustment movement with the further gripper 10 a rivet element 4 already held by the latter can be handed off to the riveting module 3. In addition, further grippers 10 may be arranged at the adjustment kinematics 9. These will then be arranged like a magazine, especially in the form of a turret.

The riveting module 3 can comprise a riveting tool 12 and at least one riveting finger 13. The riveting finger 13 here extends along a geometrical longitudinal axis A. In some embodiments, the riveting module 3 can move, especially in linear manner, to receive a rivet element 4. For the receiving of a rivet element 4, it can be moved from a working position in which the riveting module 3 places the rivet element 4 in the structural part 5 to a handoff position in order to receive the rivet element 6. Then, for the placing of the rivet element 6 in the structural part 5, the riveting module can move with the received rivet element 4 back to the working position.

In addition or alternatively, the rivet dispenser 6 may comprise a stopper 14 for stopping and position-defined holding of a rivet element 4 fed from a rivet magazine 7. By "position-defined" is meant that it is determined in position and orientation. The stopper 14 brings about a defined position of the rivet element 4 in the rivet dispenser 6. This facilitates the grabbing of the rivet element 4 by the gripper 10 of the handling device 8.

In addition or alternatively, the riveting device 1, especially the end effector 2, comprises an interim magazine 15, especially one with no actuator, for the storing of rivet elements 4. As explained in the general part of the specification, an end effector 2 or a riveting device 1 with an actuator-free interim magazine 15 is also disclosed, especially one without a handling device or with a handling device other than the one described.

The interim magazine 15 here can be designed to take up rivet elements 4 of different type and/or different size. Furthermore, the interim magazine 15 has storage places 16 for rivet elements 4. Some and especially all storage places 16 are designed to take up rivet elements 4 of different type and/or different size. This increases the flexibility when loading the interim magazine 15 with rivet elements 4. In some embodiments, the interim magazine 15 is designed such that the rivet elements 4 can be removed one at a time from each storage place 16.

Here, the interim magazine 15 can be arranged interchangeably, especially by a clamping device, on the riveting device 1, especially the end effector 2. In addition or alternatively, the interim magazine 15 or one magazine may also be arranged on the robot of the riveting device 1. The interim magazine 15 may have a plurality of interim magazine elements 17, which are arranged interchangeably, especially by a clamping device, on the riveting device 1, especially the end effector 2 and/or the robot. In this way, the riveting device 1 or the end effector 2 may be outfitted with different preloaded interim magazines 15 or interim magazine elements 17 depending on the processing job.

Figure 4:
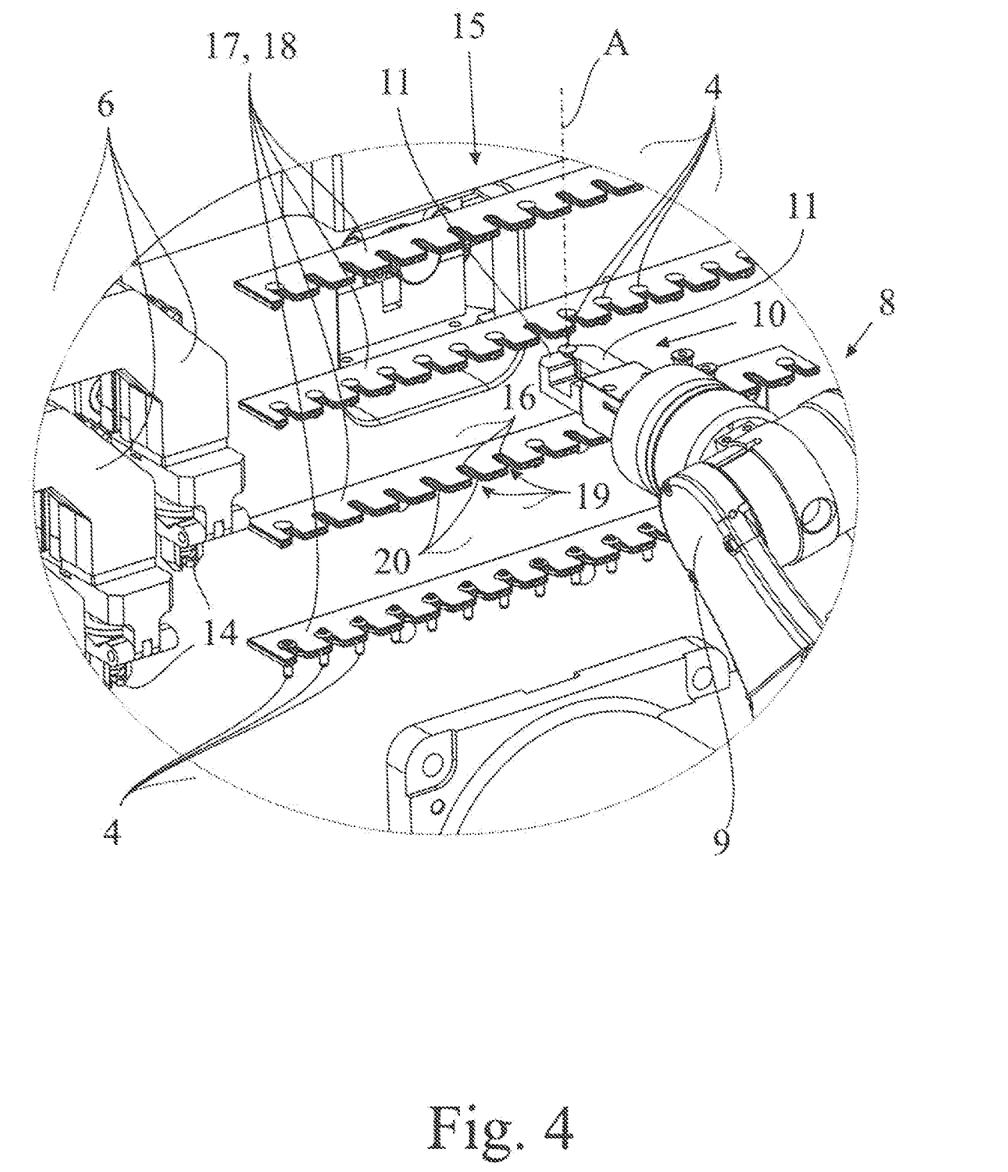
FIG. 4 shows the gripper according to the sample embodiment of FIG. 2 in a position at the interim magazine before placing the rivet element in the interim magazine.

The interim magazine 15 here may have the shape of a turret or strip. In some embodiments, the interim magazine 15, as shown in FIG. 4, has a comb structure. Thus, a large number of rivet elements 4 may be kept on hand in the interim magazine 15 in simple fashion. In some embodiments, the interim magazine 15 is designed to hold at least 25 rivet elements 4, in some embodiments to hold at least 50 rivet elements 4, and in some embodiments at least 75 rivet elements 4. This makes possible a stockpiling of a large number of different rivet elements 4 in proximity to the riveting module 3.

In addition or alternatively, the interim magazine 15 may have several storage levels 18, which here can be formed by separate comb structures. In some embodiments, a storage level 18 may be formed by an interim magazine element 17.

In some embodiments, the interim magazine 15 has guide slots 19, in which the rivet elements 4 are taken up. Each guide slot 19 can form one storage place 16 for a rivet element 4. These guide slots 19 can enable a position-defined holding of the rivet elements 4.

In addition or alternatively, the interim magazine 15 may have spring elements 20, such as tension spring clips, for holding the rivet elements 4. These can hold the rivet elements 4 received in the interim magazine 15 in position-designed manner. Here, the guide slot 19 and/or the storage place 16, especially the spring element 20, can have an inlet opening.

Figure 8:
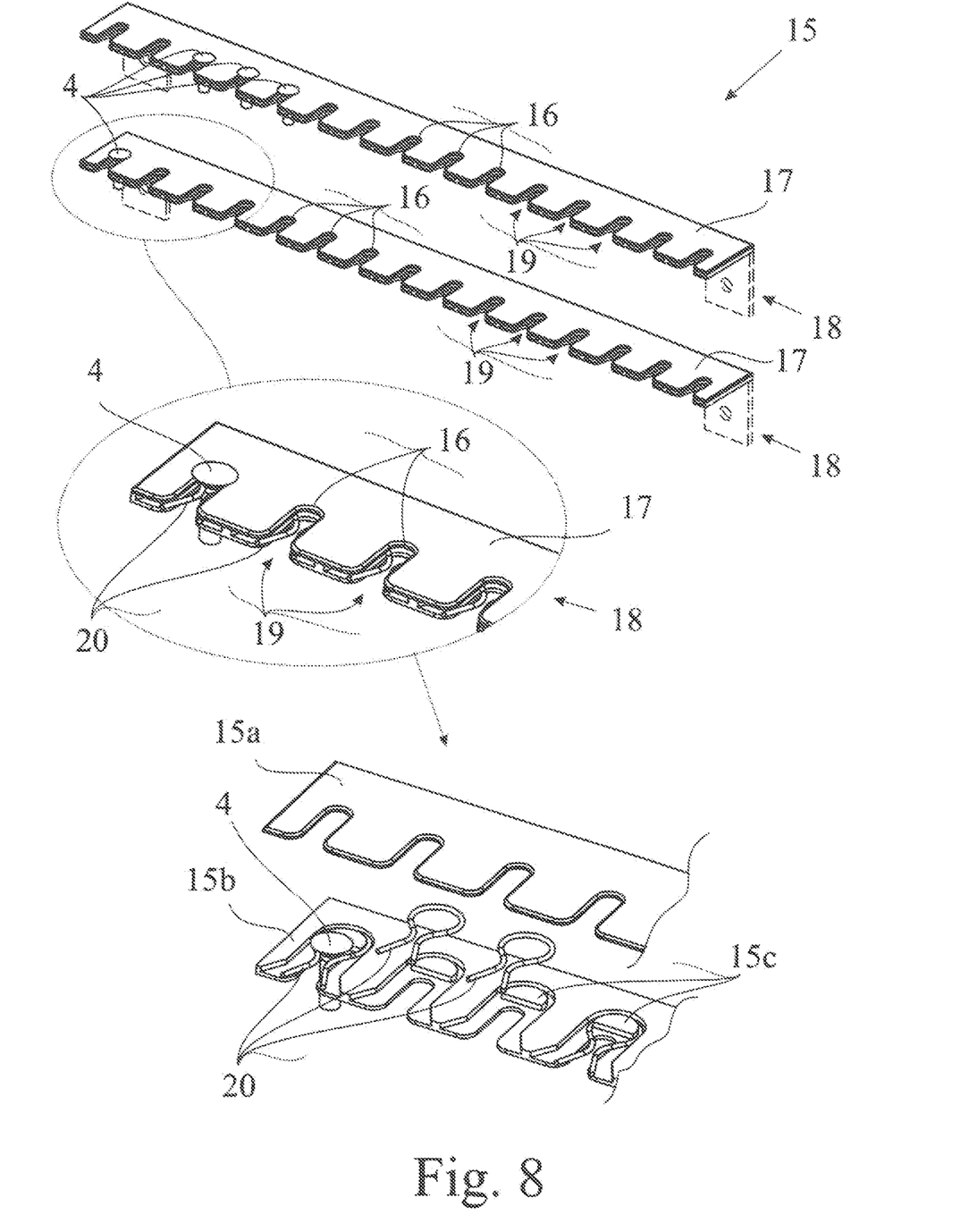
FIG. 8 shows the interim magazine next to an enlarged representation of a feature of the interim magazine in an exploded view

In some embodiments, the spring element 20 clamps the rivet element 4 on both sides, as shown in FIG. 8, or alternatively it may clamp the rivet element 4 on one side. The spring elements, especially the tension spring clips, can have a substantially round section, whose ends can each be prolonged as legs. Here, the round section extends over at least 180 degrees, such as over at least 225 degrees, such as over at least 270 degrees.

The interim magazine 15 or an interim magazine element 17 can be built up in layers, as is shown in FIG. 8. Further, the spring element 20 or the spring elements 20 are held between two layers 15a, 15b of the interim magazine 15, as is represented e.g. in the exploded drawing of FIG. 8.

In some embodiments, at least one layer 15a is fashioned as a stamped part, especially a stamped steel plate. In addition or alternatively, at least one layer 15b may be formed as a milled part.

For the holding of the spring elements 20, especially in exact position, at least one layer 15a, 15b can have an especially round holding contour 15c, along which the spring element 20 can run at least for a portion. The holding contour 15c can be formed corresponding to the round section of the spring element 20. The holding contour 15c can extend along a smaller arc section than the round section of the spring element 20.

According to an embodiment, the robot and/or the end effector has an inspecting unit (not shown) for the detecting of predetermined properties of the rivet elements 4 which are relevant to the drilling process and/or the riveting process.

For the inspecting of the rivet elements 4, the handling device 8 may deliver the rivet elements 4 from the rivet dispenser 6 and/or from the interim magazine 15 and/or from the riveting module 3 to the inspecting unit and detect, in particular measure, relevant properties of the rivet elements 4 for the drilling process and/or the riveting process. The rivet elements 4 here may be rivets 4a and/or rivet collars 4b. In some embodiments, the gripper 10 holds the rivet elements 4 during the detecting process.

After this, the riveting device 1 on the basis of the detected, especially measured, relevant properties of the rivet elements 4 may adapt the drilling process and/or the riveting process to the rivet element 4 and/or select a rivet element 4 suitable to a borehole for a borehole produced and possibly measured.

Here, the inspecting unit measures and detects, as predetermined properties relevant for the drilling process and/or the riveting process, a rivet head diameter DK and/or a rivet head length LK and/or an angle of a countersunk rivet head W and/or a transition radius R. Here, a transition radius R is a radius between two sections of a rivet element 4, especially between head 4c and shaft 4d of a rivet. In addition, the shaft diameter Ds may optionally also be determined. In some embodiments, the inspecting unit detects or measures only one section of a rivet element 4.

Of special importance is in particular the measuring of the heads 4c of the rivet elements 4 and the adapting of the borehole, especially the countersink, to the head 4c of the rivet element 4 or the selection of a rivet element 4 with a matching head 4c for a borehole, especially the countersink of a borehole.

Thus, according to an embodiment, the inspecting unit detects, for example as predetermined properties of the rivet elements 4 relevant to the drilling process and/or the riveting process, the rivet head diameter and/or the rivet head length prior to the feeding to the riveting module 3 and the riveting module 3 then produces the borehole on the basis of the rivet head diameter and/or the rivet head length, in particular, it determines the countersink depth for the borehole and performs the drilling.

Here, the inspecting unit has an optical sensor. With the optical sensor of the inspecting unit, predetermined properties relevant to the drilling process and/or the riveting process are detected. In some embodiments, a control system 21 detects, in particular measures, these properties by means of the optical sensor.

In addition or alternatively, the inspecting unit may have a light for the measuring of the predetermined properties relevant to the drilling process and/or the riveting process, which illuminates the rivet element 4 during the detection.

The light, here, is arranged opposite the sensor of the inspecting unit. The axis of illumination and the axis of viewing of the optical sensor can be arranged coaxially in this case. The viewing direction of the sensor and the light should be oriented to each other here.

In the sample embodiment, the inspecting unit is designed as a bilaterally telecentric system. This enables a precise measurement without a precise positioning of the rivet element 4 between the light and the optical sensor.

Here the measurement tolerance with the inspecting unit is less than +/−5 μm, such as less than +/−3 μm, such as it is substantially +/−2 μm.

In addition or alternatively, the riveting device 1, especially the end effector 2 or the robot, may have a collecting container (not shown) to hold unneeded rivet elements 4. In some embodiments, the handling device 8 delivers the rivet elements 4 from rivet dispenser 6 and/or the interim magazine 15 and/or the riveting module 3 to the collecting container. In some embodiments, the collecting container has an opening, especially one with a rosette, through which the gripper 10 can introduce rivet elements 4 into the collecting container. In this way, rivet elements 4 no longer needed for the next processing steps can be taken from the interim magazine 15 and/or the rivet dispenser 6 and/or the riveting module 3 to the collecting container. The delivering of rivet elements 4 can occur during the movement of the end effector 2 from one processing station to another processing station.

Here the riveting device 1 comprises a control system 21, such as an NC-control system. Further, the handling device 8 comprises its own control system 22, especially an NC-control system, which communicates via an interface 23 with the control system of the riveting device 1. In this way, a handling device 8 available on the market can be easily and cost-effectively used for the proposed riveting device 1 or the proposed end effector 2.

Figure 5:
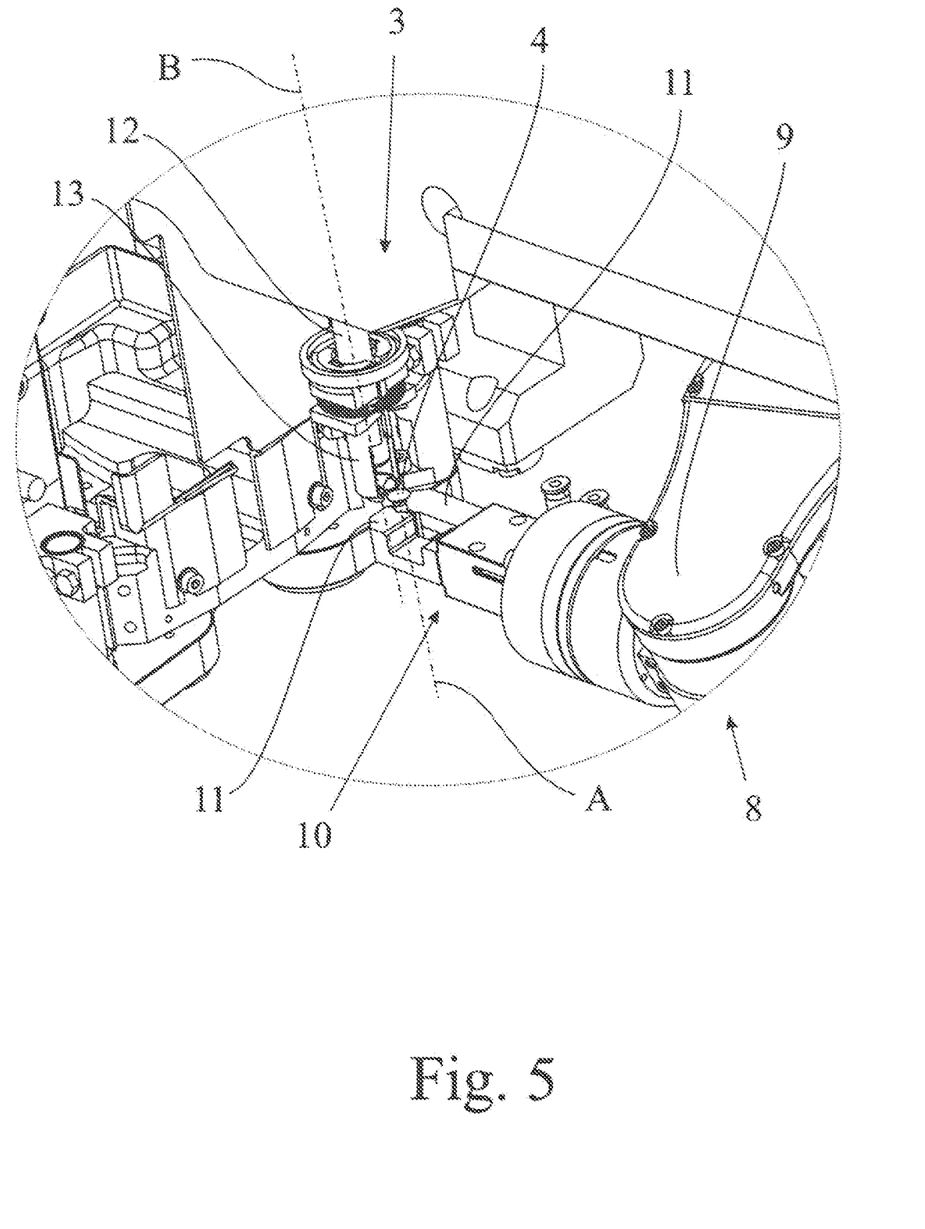
FIG. 5 shows the gripper according to the sample embodiment of FIG. 2 in a position at the riveting module before placing the rivet element in the riveting finger.
Figure 6:
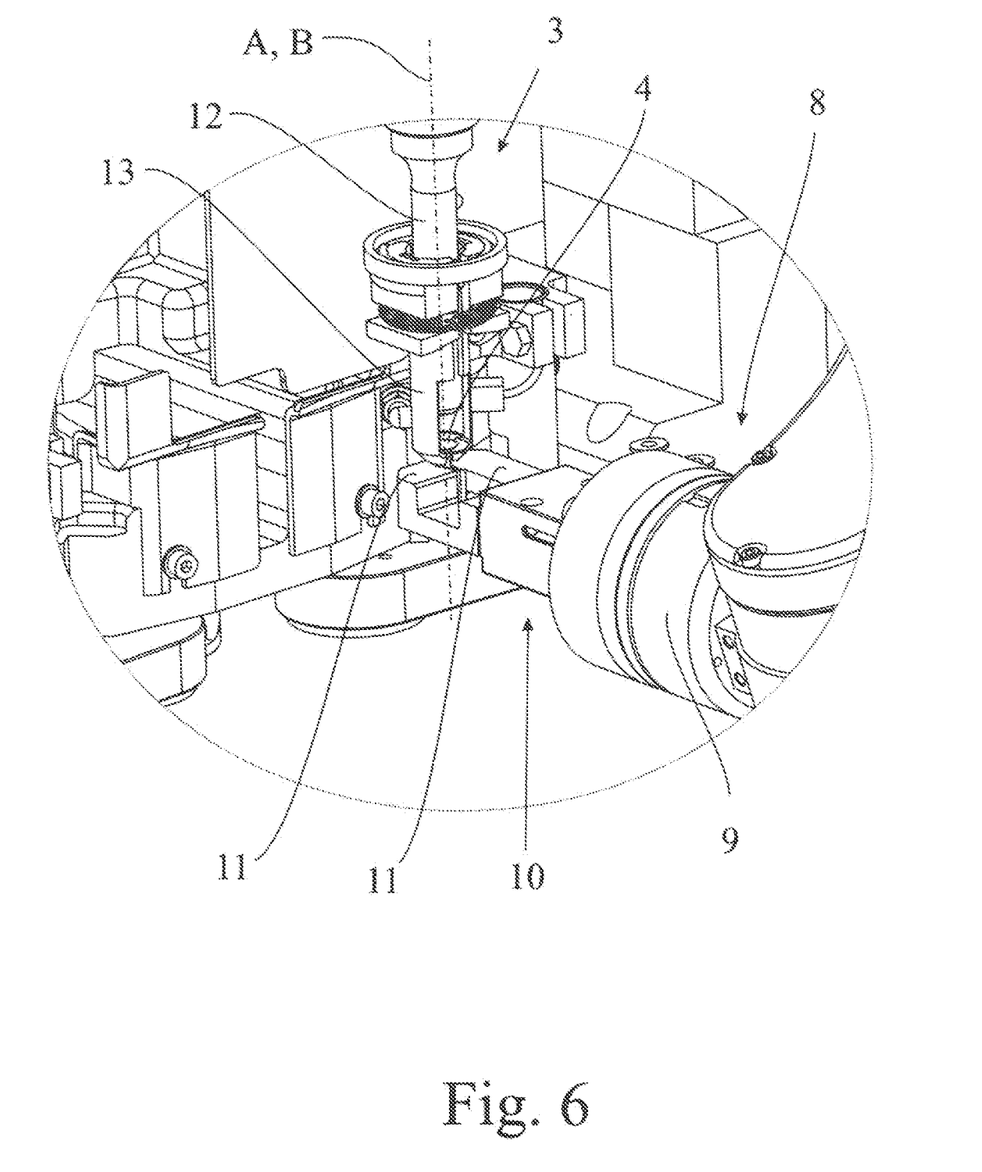
FIG. 6 shows the gripper according to the sample embodiment of FIG. 2 during the inserting of the rivet element in the riveting finger with rivet element already held in the riveting finger and FIG. 7 shows the gripper according to the sample embodiment of FIG. 2 after releasing the rivet element in the riveting finger
Figure 7:
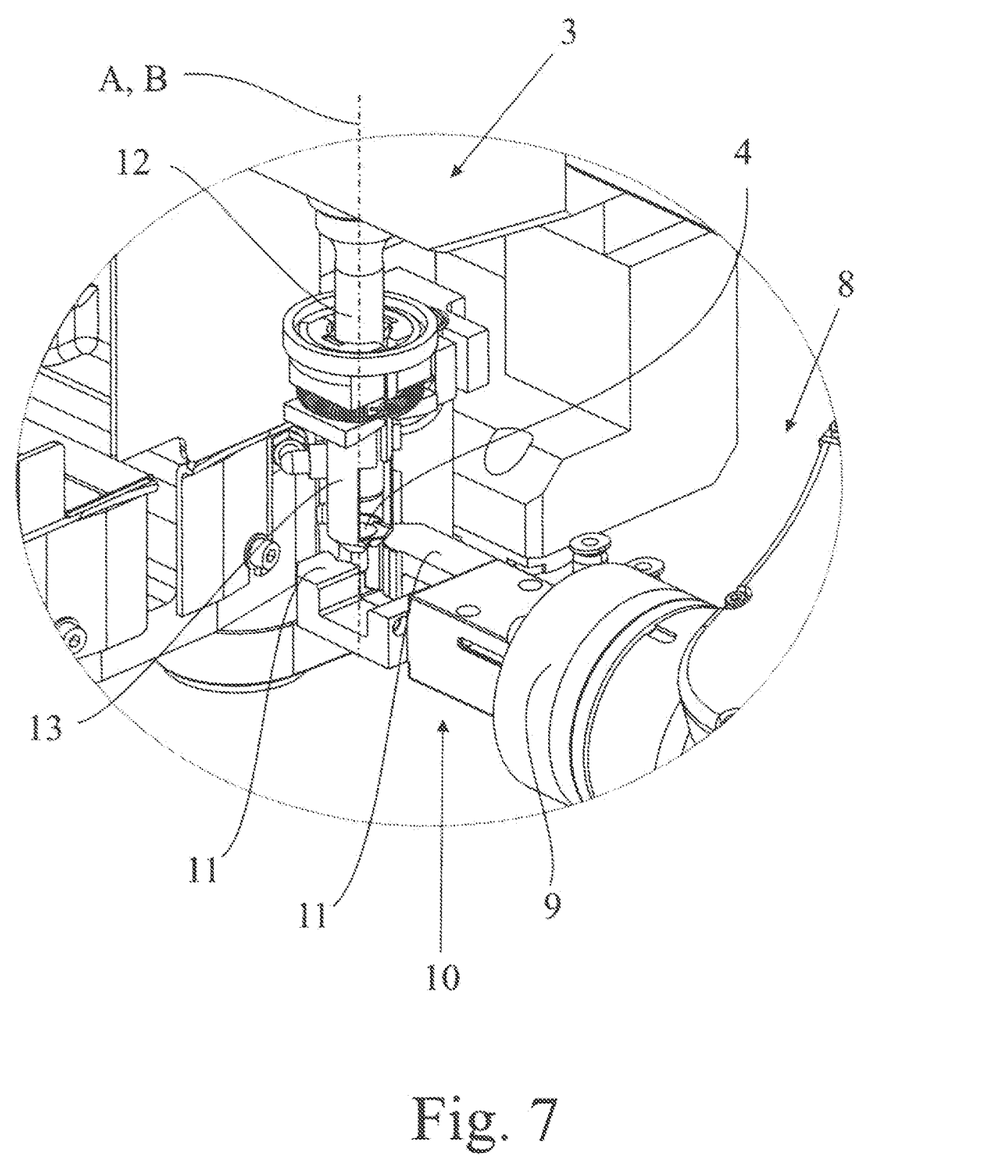

The feeding of a rivet element 4 to the riveting module 3 can occur in that the gripper 10 of the handling device 8 grabs a rivet element 4 at the rivet dispenser 6, see FIG. 3. After grabbing or taking up the rivet element 4 by the gripper 10, the handling device 8 can deliver the rivet element 4 to the riveting module 3 via a movement of the adjustment kinematics 9 and pass it on to the riveting module 3, as is shown in FIGS. 5, 6 and 7.

In some embodiments, however, the gripper 11 even after the grabbing or taking up of the rivet element 4 may deliver it by a movement of the adjustment kinematics 9 to the interim magazine 15 and pass it on to the interim magazine 15. From the interim magazine 15, if it is required, it may then be grabbed by the gripper 10 of the handling device 8 and be delivered via a movement of the adjustment kinematics 9 to the riveting module 3 and handed off to it.

In FIG. 3, the rivet element 4 is held in defined position in the rivet dispenser 6. The rivet dispenser 6 is approached by the handling device 8 and the gripper 10 grabs the rivet element 4. Here, it takes up the rivet element 4 in defined position.

After this, the handling device 8 may deliver the received rivet element 4 either to the interim magazine 15 and/or to the riveting module 3. FIG. 4 shows how the handling device 8 hands off the rivet element 4 to the interim magazine 15. For this, the gripper 10 moves the rivet element 4 in a guide slot 19 of the interim magazine 15. The handover of the rivet element 4 to the interim magazine 15 can occur in defined position.

When the rivet element 4 has been taken up by the interim magazine 15, especially in defined position, the gripper 10 opens and releases the rivet element 10. The gripper 10 may now approach another storage place 20 of the interim magazine 15 and take up another rivet element 4 in defined position or take up another rivet element 4 from the rivet dispenser 6.

For the loading of the riveting module 3 with a rivet element 4, the gripper 10 here grabs a rivet element 4 from the rivet dispenser 6, as shown in FIG. 3, or from the interim magazine 15. After this, the handling device 8 delivers the rivet element 4, here a rivet element 4 from the interim magazine 15 and/or the rivet dispenser 6, to the riveting module 3.

Here, the gripper 10 passes off the rivet element 4, especially in defined position, to the riveting module 6, especially the riveting finger 13. In some embodiments, during the handoff from the gripper 10, the longitudinal axis of the rivet element 4 is brought coaxially into alignment with the longitudinal axis of the riveting finger 13. According to various embodiments, only after this does the gripper 10 open in order to pass off the rivet element 4 to the riveting finger 13.

These steps of the method are shown in FIGS. 5, 6 and 7. First of all, FIG. 5 shows the gripper 10 just in front of the riveting finger 13. FIG. 6 shows how the longitudinal axis B of the riveting finger 13 and the longitudinal axis A of the rivet element 4 have been brought into alignment. FIG. 7 then shows how the gripper 10 opens and passes the rivet element 4 off to the riveting finger 13. Here, the riveting module 3 then moves into the working position and the riveting module 3 can place the rivet element 4 in the structural part 5.

At the end effector 2 and/or the riveting device 1, especially the robot, further handling devices 8 may be provided for delivery of a rivet element 4 in the above-described manner, especially from the rivet dispenser 6 to the riveting module 3. The preceding remarks on the handling device 8 hold analogously for the further handling device 8, so that in this regard one may refer to the preceding remarks.

The end effector 2 and/or the riveting device 1 can be designed and set up so that the end effector 2 or the riveting device 1 can carry out the above-described steps of the method.

Figure 9:
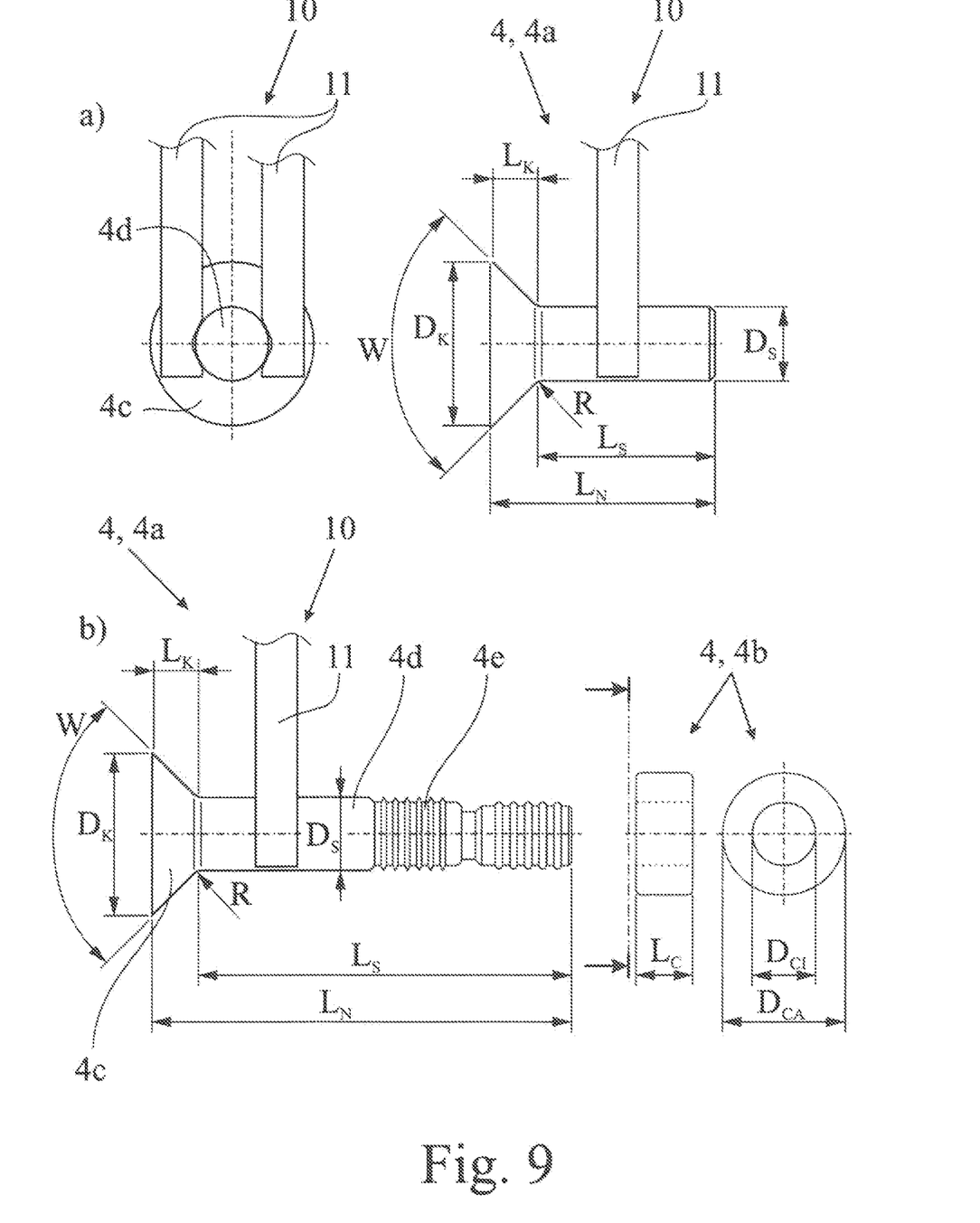
FIG. 9 shows, as an example, rivet elements grabbed by a gripper of the handling device.

Finally, FIG. 9 shows as an example of the rivet elements: a) a solid rivet with countersunk head, b) a tolerance rivet with countersunk head and a rivet collar corresponding to the tolerance rivet. Furthermore, many other rivet elements 4 can also be fed by the handling device 8 to the riveting module 3. These may also be, in particular, screw rivets and/or blind rivets.

For the rivet elements 4 shown in FIG. 9 there are shown examples of possible relevant properties for the drilling process and/or the riveting process, where a selection from these may depend in each case on the requirements for the rivet connection being produced. The relevant properties here are the rivet length LN and/or the shaft length Ls and/or the head length LK and/or the head diameter DK and/or the shaft diameter Ds. Moreover, the countersunk head angle W and the transition radius R are indicated as possible relevant properties for the drilling process and/or the riveting process. Furthermore, a rivet structure, namely the locking grooves 4e of the tolerance rivet in FIG. 9b), are shown.

For the rivet collar 3b, relevant properties for the riveting process are shown here as being the rivet collar length $L_C$ and the rivet collar inner diameter Do and the rivet collar outer diameter $D_{CA}$.

The invention claimed is:

1. An end effector for a riveting device, the end effector comprising a riveting module for placing a rivet element in a structural part, a rivet dispenser for dispensing rivet elements from a rivet magazine and a handling device for delivering a rivet element from the rivet dispenser to the riveting module, wherein the handling device comprises an adjustment kinematics and a gripper arranged thereon for grabbing the rivet element, and wherein the adjustment kinematics has at least two adjustment axes for positioning the gripper, wherein at least two of the adjustment axes are axes of rotation.

2. The end effector as claimed in claim 1, wherein the adjustment kinematics for the positioning of the gripper comprises at least three adjustment axes.

3. The end effector as claimed in claim 1, wherein the adjustment axes of the adjustment kinematics are arranged kinematically sequentially and/or kinematically parallel.

4. The end effector as claimed in claim 1, wherein the handling device is designed as an industrial robot, in particular as a bending-arm robot.

5. The end effector as claimed in claim 1, wherein the gripper comprises at least two gripping fingers and can grab rivet elements of different type and/or different size.

6. The end effector as claimed in claim 1, wherein the gripper holds the rivet element in a force-fitting and/or form-fitting manner while conveying the rivet element.

7. The end effector as claimed in claim 1, wherein the riveting module comprises a riveting tool and at least one riveting finger, wherein the riveting finger extends along a geometrical longitudinal axis along which the rivet element is inserted into the structural part.

8. The end effector as claimed in claim 1, wherein the rivet dispenser comprises a stopper for stopping and position-defined holding of a rivet element fed from a rivet magazine.

9. The end effector as claimed in claim 1 wherein the end effector comprises an interim magazine for storing of rivet elements.

10. The end effector as claimed in claim 9, wherein the interim magazine comprises spring elements which hold the rivet elements received in the interim magazine in a position-defined manner.

11. The end effector as claimed in claim 9, wherein the interim magazine has no actuator.

12. The end effector as claimed in claim 1, wherein the adjustment kinematics for the positioning of the gripper comprises at least four adjustment axes.

13. A riveting device comprising an end effector, wherein the end effector comprises a riveting module for placing a rivet element in a structural part, wherein the riveting device further comprises a rivet dispenser for dispensing rivet elements from a rivet magazine and a handling device for delivering a rivet element from the rivet dispenser to the riveting module, wherein the handling device comprises an adjustment kinematics and a gripper arranged thereon for grabbing the rivet element, and wherein the adjustment kinematics has at least two adjustment axes for positioning the gripper, wherein at least two of the adjustment axes are axes of rotation.

14. The riveting device as claimed in claim 13, wherein the riveting device comprises a robot which carries the end effector, and wherein the handling device is arranged separately from the end effector on the robot carrying the end effector.

15. The riveting device as claimed in claim 13, wherein the riveting device comprises a control system, wherein the handling device comprises a control system which communicates via an interface with the control system of the riveting device.

16. The riveting device as claimed in claim 13, wherein the gripper of the handling device is configured to grab a rivet element at the rivet dispenser and the handling device is configured to delivers the rivet element to the riveting module via a movement of the adjustment kinematics and pass the rivet element on to the riveting module.

17. The riveting device as claimed in claim 16, wherein the gripper is configured to take up the rivet element at the rivet dispenser and/or an interim magazine in a position-defined manner and/or wherein the gripper is configured to pass on the rivet element in position-defined manner to the riveting module and/or the interim magazine, wherein the gripper is configured to only releases the rivet element during the handover when the rivet element is situated in the longitudinal axis of the riveting finger and/or in a holding position of the interim magazine.

18. The riveting device as claimed in claim 13, wherein the adjustment axes of the adjustment kinematics are arranged kinematically sequentially and/or kinematically parallel.

19. The riveting device as claimed in claim 13, wherein the riveting device comprises an interim magazine for storing of rivet elements.

20. The riveting device as claimed in claim 13, wherein the gripper comprises at least two gripping fingers and can grab rivet elements of different type and/or different size.

* * * * *